United States Patent [19]
Robinson

[11] 3,777,410
[45] Dec. 11, 1973

[54] INTERACTIVE DISPLAY AND VIEWER RESPONSE APPARATUS AND METHOD

[75] Inventor: John Wesley Robinson, Rockville, Md.

[73] Assignee: Telattach, Inc., Chevy Chase, Md.

[22] Filed: Mar. 1, 1972

[21] Appl. No.: 230,698

[52] U.S. Cl. .................................................. 35/9 B
[51] Int. Cl. ............................................ G09b 7/02
[58] Field of Search ..................... 35/8 R, 9 R, 9 A, 35/9 B; 40/125 C

[56] References Cited
UNITED STATES PATENTS

| | | | |
|---|---|---|---|
| 3,095,653 | 7/1963 | Corrigan | 35/9 B |
| 914,776 | 3/1909 | Aarons | 40/125 C |
| 3,077,038 | 2/1963 | Williams et al. | 35/9 B |

Primary Examiner—Wm. H. Grieb
Attorney—Morris Fidelman et al.

[57] ABSTRACT

An interactive display and viewer response method utilizing several types of apparatus. A program image and a control image are displayed on a screen, the program image being addressable by the viewer who may either remain inactive or activate the particular apparatus in response to the program image. Simultaneously, the control image activates a photooptical readout assembly with which the viewer interacts by instituting in action in the apparatus.

15 Claims, 20 Drawing Figures

PATENTED DEC 11 1973 3,777,410
SHEET 1 OF 6
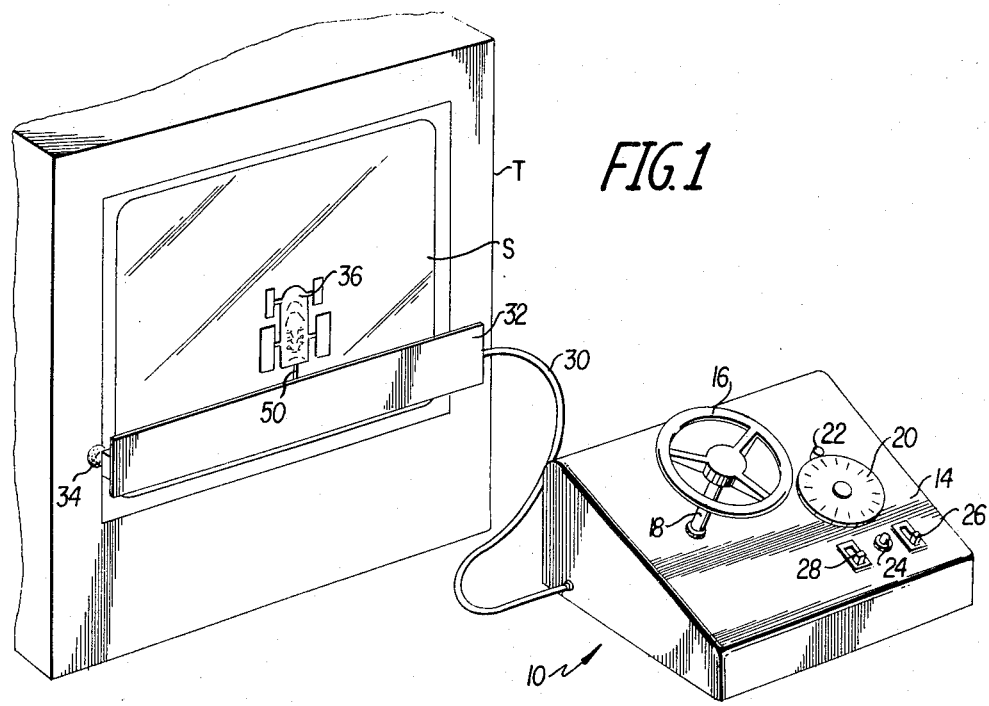
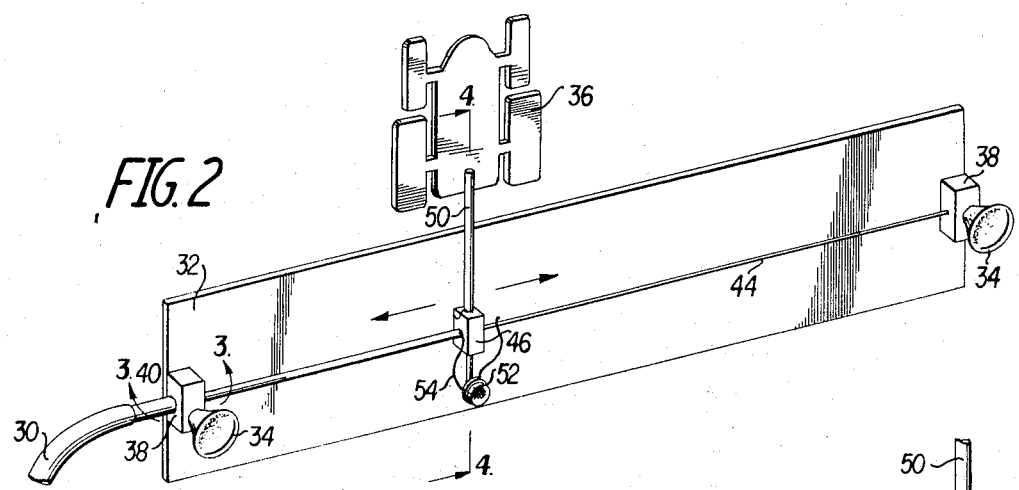
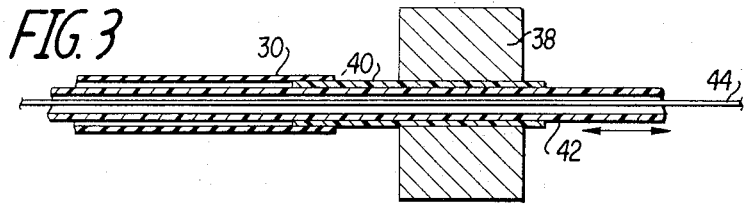
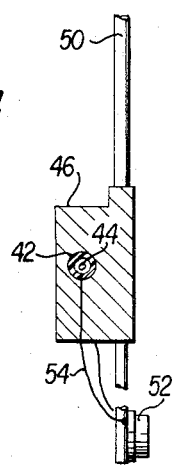

INTERACTIVE DISPLAY AND VIEWER RESPONSE APPARATUS AND METHOD

The invention relates to a method of visual display and and/or response employing optical readout technology and devices in conjunction with television or motion picture-screen imaged programming.

A series of uniquely designed devices interconnected to photocells and attached directly to the face of the tube or screen provide the user-viewer with a vehicle to effect human judgement, action and reaction.

An image is projected which has two components; an upper one which is hereinafter referred to as the program image and a lower or side one referred to as the control image. The program image is the actual program, programming or film seen on the screen.

The control image is not viewable and has control information encoded into the image and is essentially a "black" area where "white" spots appear and disappear with time, as well as move laterally. The occurrence and position of the white spots and their movement is so designed as to allow the photocell attachment to sense the presence or absence of light. Various types of optical readout devices are envisioned, including rows of photocells along the bottom, sides or side of the television screen. Alternatively, a hood arrangement having photocells positioned within the suction cup attachment portion may be used and "stuck" onto a generally circular control image area in a corner of the screen. The photocells read the incoming signal provided by a number of light channels being transmitted. They read this control information in a binary code configuration, or in any number of other numbering or coding systems.

In each case the photocells are part of an electronic circuit of standard or conventional design. When activated, the photocells "see" light and no current flows. When the photocells don't see light, current flows into the electronic circuit and action is instituted. The various product devices are designed to permit a user-viewer to interact with this effect.

The original programming material can be a motion picture film or be "live" as when done through the medium of either television broadcasting or closed circuit television, or produced on video tape and subsequently telecast. In this connection, either the Chroma-Key method or some other suitable set-up which is standard in modern television production, could be used to generate the appropriate composite image. The control program information can be encoded in terms of the presence or absence of light spots, the positions of those spots and the particular moment at which any of the spots are present or absent. The spot or spots may vary in intensity, pulse at various frequencies, vary in size or shape in relation to time and may be grouped or arranged within the image area in a predetermined manner.

The product devices which receive this information and by which an operator-viewer may react to it take on several forms. One embodiment is in the form of a Driver's Set including a console having a steering wheel, power switch, buzzer, scoring counter and transitorized electronic circuit. The console is connected via a flexible co-axial lead to an attachment for securing to the face of a television screen or to the front of a rear-screen motion picture projection device. The attachment has a model racing car which is movable from side-to-side by turning the steering wheel on the console. Directly below the racing car, and out of sight of the viewer, is a photocell that is attached to the car for side-to-side movement therewith.

When the Driver's Set is turned on and the photocell sees light, no current flows in the transistorized circuit and the relay is not tripped. Connected to the normally closed contacts of the relay is a battery-powered counting or scoring device that operates as long as this "no current" condition exists. When the photocell does not see light, then current flows, the relay pulls in and the scoring counter stops. Additionally a buzzer is wired to the relay contacts in such a way as to give an alarm when the relay closes.

As discussed previously, the image used in conjunction with the Driver's Set has two components: the upper one, herein referred to as the program image and the lower one referred to as the control image. In this case, the program image shows cars racing on a track. It is a moving image, the view being one that might be seen by a person speeding down the track, passing slower moving cars, and being passed by faster moving cars. The apparent size and perspective of these cars has been so designed as to match that of the model car of the Driver's Set.

Programs for telecasting or motion picture projection which take the viewer-operator to famous races and race tracks are contemplated. With such programs, the viewer-operator is able to drive his own "car" in competition. Programs covering the "Grand Prix", the "Indianapolis 500", and European road-racing are among those available Personality-type interviews with famous race drivers would be filmed and made a part of such racing presentations. Competition races amongst the users of those devices can be conducted to see which would have the finest score.

Another product device is the Pilot's Set, which provides a higher level of interaction between the viewer and the programming image. The Pilot's Set is similar in many respects to the Driver's Set, but differing in the fact that a control stick replaces the wheel and allows the viewer-operator to maneuver the stick backward and forward as well as side to side. Manuevering this control stick causes a model airplane on the attachment member to move both horizontally and vertically. At the same time, two photocells are moved across the control image area, one picking up horizontal position information and the other vertical position information. The light spots for each "channel" can be positioned one above the other, or can be placed along the vertical axis of the image.

The Pilot's Set allows a more complex kind of interaction than the Driver's Set since there are two interrelated channels of information coming in within the same time frame. Further, additional channels can be added. For example, the Pilot's Set can include a mechanical means for banking the aircraft, with appropriate control information incorporated in the programming image. Likewise, of course, the Driver's Set might have another channel conveying information that indicates when the viewer-operator should depress a brake pedal attached to the device. For the Pilot's Set, the programming image would show aerial scenes in which the toy aircraft had to be manuevered vis-a-vis other aircraft or obstacles, or landed on a carrier in a pitching sea, etc.

Another type of device comprising this invention consists of an "addressable" response device incorporating a number of back-lit push buttons. Connected to it by a flexible cable is the photocell suction-cup assembly affixed to the screen. A group of stationary photocells within reads the incoming signal information, which in this case is provided by a display of a number of light channels. The circuit wiring is such that when the "correct" button is pushed, it energizes appropriate portions to produce either an audible or visual signal to the viewer-operator. Additionally, the circuit is designed to be "addressable", so that an appropriate control image causes a particular lamp(s) to light, even without the viewer-operator pushing any of the buttons. The button panel is so designed as to accept overlays which allow individual buttons to represent either letters, numbers, playing cards, real objects, etc. Further the circuitry is designed to accept associated devices, such as a counting or scoring device or any number of other mechanisms that might be activated or controlled.

The light box described is a new concept in teaching and training at all levels, as well as a novel device for game playing. With an overlay of letters placed on the buttons, it is possible to have, for example, an interactive Sesame Street program designed to teach a child the alphabet by allowing the child to respond immediately to the studio people. The program could be "live" or taped, and could involve either real people or animated characters. They could light up letters for him; or let him light up correct ones. With such a system, the child would have immediate feedback and the device could provide or mediate any number of reward systems.

Another version of the invention utilizing the light box concept is a series of programs on "How to Play Winning Poker". In this learning game, the viewer would be shown a sequence of scenes of open poker hands. The viewer would be from above the middle of a table with all the dealt hands exposed — including the viewer's own. The viewer would have the uniquely-designed light box with poker card picture representations as the overlay on each of the switch buttons. The box would be inteconnected to the TV screen via a control signal pickup suction-cup attachment.

The player-viewer's hand is explained to him in stages and "between draws" by the narrator on the screen, and as the game progressed with cards being discarded and drawn (or continuously dealt as in seven-card stud) the viewer is given various options requiring exercise of judgement and choices as to which cards "count" in his hand vis-a-vis the others and which "beat" what. He transmits his choice and judgement by pushing the correct or "best choice" light buttons on is response device. By selecting the "right" answer either an audible or visual signal is given him through the light box control circuitry. The entire sequence of sights and sounds and individual interactive responses is closely coordinated in the design of the programming. "Aside" instructions or discussions tell the viewer the various pro's and con's and expected results of various actions. For instance, "Should a raise be made in the face of a check?" Various alternatives are presented to him. The programming takes into account such timing factors as are necessary to permit the player-viewer to exercise his dicision. By continuous interplay in this manner, the player receives instruction.

A multitude of games can be taught this way. A Bridge game or a Gin Rummy setup and presentation can be employed. A Chess or Checker match, or lesson, can be experienced just as readily as the poker game, and recognized experts in various fields can be employed to participate in the image material and narration.

Both the Driver's Set and the Pilot's Set have been presented in the form of toys. Obviously there are other purposes that can be served by these devices in somewhat varied forms, i.e., driver trainers for teaching motor vehicle operation, and flight simulation devices for beginning pilots. Currently existing devices of this nature are extremely costly and therefore unavailable to most of the people who need them, or, as in the case of the several driver trainers now in use in high schools throughout the country, do not provide immediate feedback to the trainee.

A number of other interactive toys or playthings are envisioned that receive their control information from the television set or movie screen. For example, toys that come to "life" when attached by suction cup photocell to the TV set, and then go through whatever tricks are commanded by the television program and or personalities seen on the screen. These toys contain cassette "memories" which allow them to be programmed in the sense that a computer is programmed. The toys can then become progressively "intelligent" with repeated contacts to the TV set and if the program that had been stored in any one particular toy could be obtained by another toy, then this "intelligence" could be replicated with one toy teaching another.

Accordingly, it is an object of this invention to provide a unique method of visual display and response employing optical readout technology in conjunction with television or motion picture screen imaged programming.

Another object of this invention is to provide apparatus for receiving control images off a television or motion picture screen and providing viewer-operator response to a program image accompanying said control images.

A further object of this invention is to provide various optical readout systems for reacting to control images on a television or motion picture screen.

A still further object of this invention is to provide various optical readout systems for reacting to control images in the form of, and in conjunction with, a dark background, the presence or absence of light spots, a moving light spot, the positions of light spots, pulsing light spots, light spots that may change in intensity and/or the grouping or arrangement of such spot or spots.

These and other objects of the invention will become apparent when reference is made to the accompanying specification and drawings in which:

FIG. 1 is a perspective view of one embodiment of the invention showing a control console and a television screen attachment;

FIG. 2 is a perspective view of the television attachment of FIG. 1;

FIG. 3 is a partial cross-sectional view taken along lines 3—3 of FIG. 2;

FIG. 4 is a cross-sectional view taken along lines 4—4 of FIG. 2.

FIG. 13a is a partial perspective view of a first overlay that may be used by an operator-viewer in conjunction with the second embodiment of this invention;

FIG. 13b is a partial perspective view of a second overlay that may be used by an operator-viewer in conjunction with the second embodiment of this invention;

FIG. 13c is a partial perspective of a third overlay that may be used by an operator-viewer in conjunction with the second embodiment of this invention;

FIG. 14 is a partially sectioned side view of a third embodiment of this invention;

FIG. 15 is a front view of the embodiment of FIG. 14;

Figure 5:
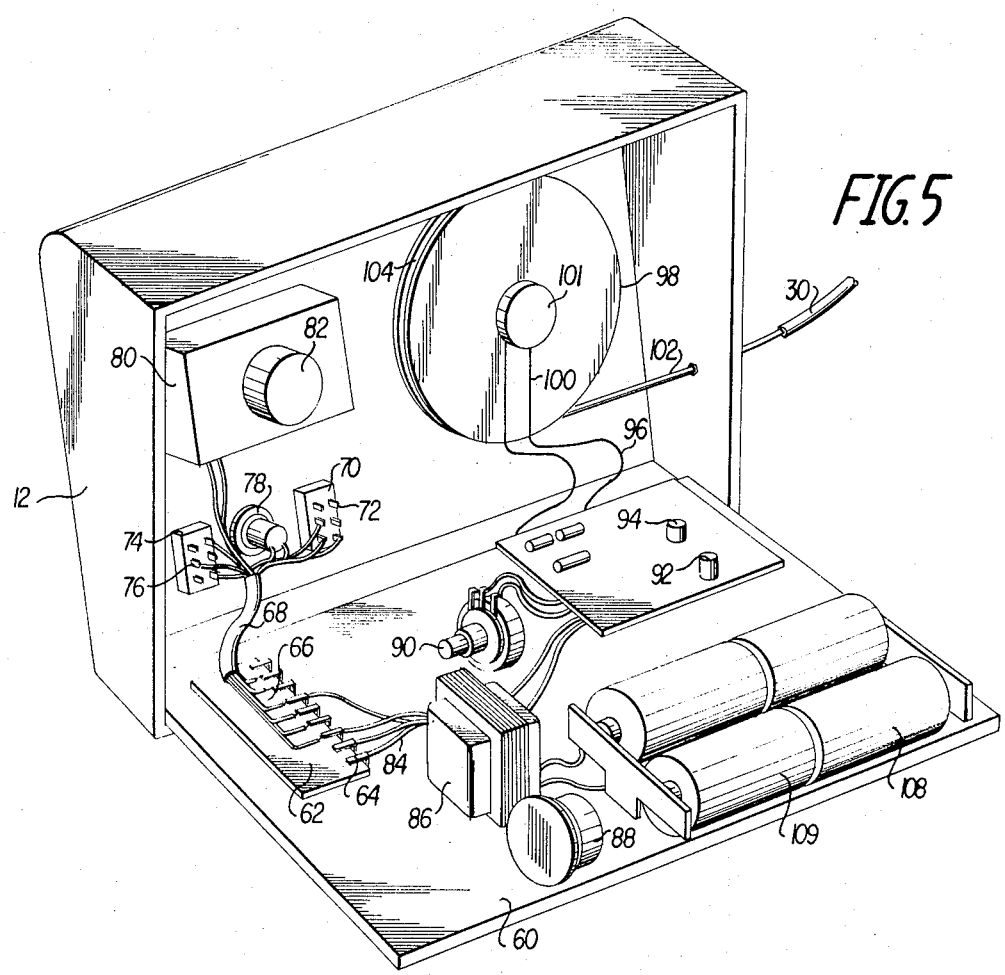
FIG. 5 is a rear perspective view of the control console of FIG. 1 with the cover swung upwardly to show the physical layout of the electronic circuitry.
Figure 6:
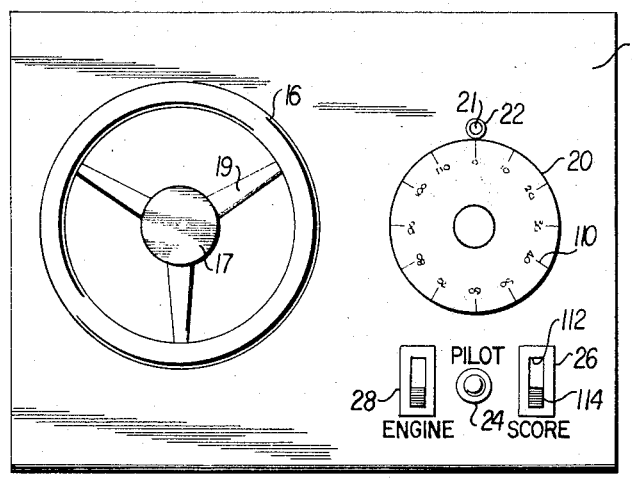
FIG. 6 is a plan view of the control console showing the various operator controls.

Referring now to FIGS. 1 and 6, the first embodiment of this invention comprising a Drivers Set is shown generally designated as 10. It consists of a console box 12 having an angled planar control surface 14 on which are located a steering wheel 16 having spokes 19 (FIG. 6) a hub 17 and a column 18. A scoring counter wheel 20 having scoring indicia such as 110 thereon is shown. Wheel 20 is adapted to freely rotate about the center which is journaled by any conventional means (not shown) to the control surface 14. Wheel 20 has its circumferential edge in engagement with a rubber or soft bushing 22 mounted on the end of a drive shaft 21 which is driven by a motor 80 (FIG. 5).

Also located on the control surface of the console is a pilot light 24 to inform the operator-viewer that the power is on, a scoring counter motor switch 26 to activate the scoring wheel 20 and a main power switch 28. Switches 26 and 28 are of identical construction and have slots such as 112 and movable switch arms such as 114.

A flexible co-axial drive lead 30 connects the console 12 with an attachment 32 on a television set T having a screen S. The attachment 32 is a flexible, rectangular member made of plastic.

Attachment 32 has a pair of mounting supports 38 mounted on the rear thereof by any conventional means and a pair of suction cups 34 are mounted on the supports 38. The suction cups 34 are adapted to secure either end of attachment 32 to the sides of a television screen such as S or on the opposite front surfaces of the television set as shown in FIG. 1. Alternatively other fastenings, such as spring loaded clamps, can be used.

Lead 30, as shown in FIG. 3, consists of a flexible plastic tube enclosing a plastic sheath 42 which, in turn, coaxially surrounds a control cable 44. This arrangement allows for flexing of the cable, sheath and tube between the console 10 and the television set T. One of the supports 38 has a tubular insert 40 mounted therein and the extended end of 40 fits between the tube 30 and sheath 42. Tube 30 is stationary but sheath 42 is adpated to be moved longitudinally and generally coaxially within tube 30 and tubular insert 40. The sheath 42 has its end portion attached, in any suitable fashion, to a movable target block 46. The end of cable 44 has its end attached to support 38. Thus, sheath 42 and its attached target block 46 are adapted to move longitudinally along the rear surface of attachment 32.

As shown in FIG. 4, target block 46 has a vertical support arm 50 attached thereto and which extends upwardly above the top edge of attachment 32 and a short distance below block 46. Mounted on the bottom of support arm 50 is a photocell 52 with its light-sensitive area facing away from the rear surface of attachment 32 and towards the television screen as shown in FIGS. 1 and 2.

The top of rod 50 has a target 36 attached thereto, the target being in the form of a silhouetted racing car. As sheath 42 moves longitudinally along attachment 32, target 36, with its accompanying photocell 52 moves along in front of the television screen.

Referring now to FIG. 5, the console 12 is shown with its top portion hinged upwardly. The top portion may be hinged to a base plate 50 or may have the base plate 60 secured thereto by means of bolts, screws, etc. Base plate 60 has a terminal board 62 mounted thereon which has connection clips such as 64 thereon which are connected to wires such as 84 leading to other components. The clips are adapted to accept the ends of wires such as 66 extending from wiring harness 68. Harness 68 contains all the circuit wires, except two, leading from base plate 60 to the under surface of control panel 14. As shown in FIG. 5, the underside of panel 14 contains switch housings 70 and 74 (the base of switches 28 and 26, respectively) and the base 78 of pilot light 24. Housings 70 and 74 also have connection clips such as 72 and 76, respectively, for receiving wires from harness 68.

Also mounted on the undersurface of panel 14 is a motor housing 80, having journal box 82 for driving shaft 21 and the counter wheel 20.

Mounted adjacent motor housing 80 is a pulley wheel 98 having a large circumferential groove 104. A cap member 101 secures the pulley 98 to the base of column 18 of the steering wheel 16 for rotation therewith.

The end 102 of sheath 42 is secured to the wheel 98. The sheath is partially wrapped around pulley 98 so that as an operator turns steering wheel 16, target 36 may move from one end of attachment 32 to the opposite end, i.e. a full longitudinal movement across the front of television screen S.

A pair of wires 100 extend from a PC board 92, having components such as 94 thereon, to pulley 98. As shown, the wires extend to the peripheral edge of pulley 98 and then are secured to the face of the pulley as at 100, and extend inwardly to cap 101. The wires then pass through a radial bore (not shown) from the center of pulley 98 to the point in groove 104 to which the end of sheath 42 is attached. The wires then extend within and along the length of sheath 42 all the way to block 46 where they are either attached to or integral with wires 54 (FIGS. 2 and 4) from photocell 52.

As an alternative arrangement, wires 96 may extend from the PC board 92 to cap 101, then outward radially as at 100 and over the peripheral lip of pulley 98 into groove 104 to enter the space between wires 44 and sheath 42. Various arrangements, of course, can be used; the main purpose being to afford smooth movement of target 36 by turning wheel 16, yet insuring against too must twisting of the current-carrying wires 96 and breakage or fatigue thereof. To facilitate smooth movement, tube 30 may be made of polyethylene and sheath 42 and insert 40 of a polytetrafluorene material, such as Teflon.

PC board 92 is shown as having components 94 but the majority of components are not shown. Wires extend from the PC board to potentiometer housing 90, an internal control used to set the operative limits for the photocell 52, and to relay 86. Other wires connect four flashlight batteries such as 108,109, held in clip 106, and buzzer 88 to the main circuit. The actual schematic is shown in FIG. 7.

Figure 7:
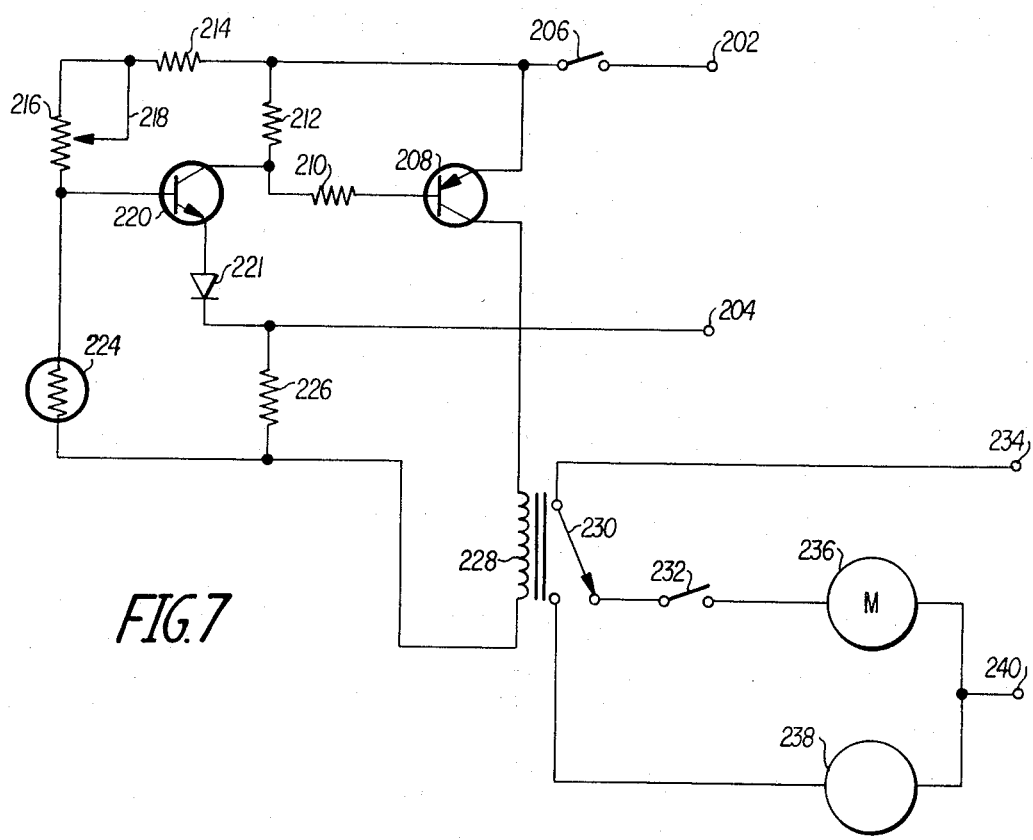
FIG. 7 is a schematic view of the electronic circuitry of the control console.

FIG. 7 is an electronic schematic showing the circuitry of the control console. The circuit is powered by a 6 volt battery source across contacts 202 and 204. The circuit further comprises resistors 214, 212, 210 and 226. transistors 208 and 220, potentiometer 216,218, diode 221, photocell 224, power switch 206 and relay 228 complete the basic circuit. When the photocell is deactivated by an absence of light or a low level of light, relay 228 is activated by transistors 208 and 220, thus causing relay arm 230 to complete the buzzer circuit comprising buzzer 238 and a 6 volt source between contacts 234 and 240. When the photocell is normally activated by the continuous presence of a predetermined level of light, the arm 230 is biased away from relay 228 and completes a circuit across contacts 234 and 240 and activates the score counter motor 236 when switch 232 is closed.

The level of light which will activate or deactivate the photocell 224 and its accompanying circuitry can be set by potentiometer 216.

To operate the device, an operator viewer first turns on the main power switch 28, or 206 as seen in FIG. 7. This energizes transistors 208 and 220, diode 221 and photocell 224. The levels of operation have been previously set by adjusting potentiometer 216,218. This adjustment is necessary because of varying room light levels, set brightness and "snow" in the image on screen S and the difference in light intensity between color and black and white television sets. Whatever image is projected or transmitted on the screen S should include a test pattern for a few seconds which would provide a sufficient level of light for the photocell to energize to cut off power to relay 228, allowing arm 230 to establish itself in the position shown in FIG. 7. Switch 232 is thrown at the commencement of the programmed image which usually will be for a predetermined amount of time. The image program will consist of a perspective view of a race track involving open sretches of the racetrack and the images of other racecars. The operator-viewer then attempts to maintain target car 36 clear of the other racecars, the images of which, when they are being overtaken, will move from the top of the screen to a point just below the upper edge of attachment 32. The operator-viewer will only see this portion of the filmed or transmitted program. The base of the image, i.e., that portion hidden behind attachment 32, will be in the form of a constantly shifting area or "spot" of light with dark areas on each side thereof. The position of the moving spot of light will be coordinated with the open areas of racetrack that the operator-viewer will be attempting to maintain his target car 36 in.

Figure 16:
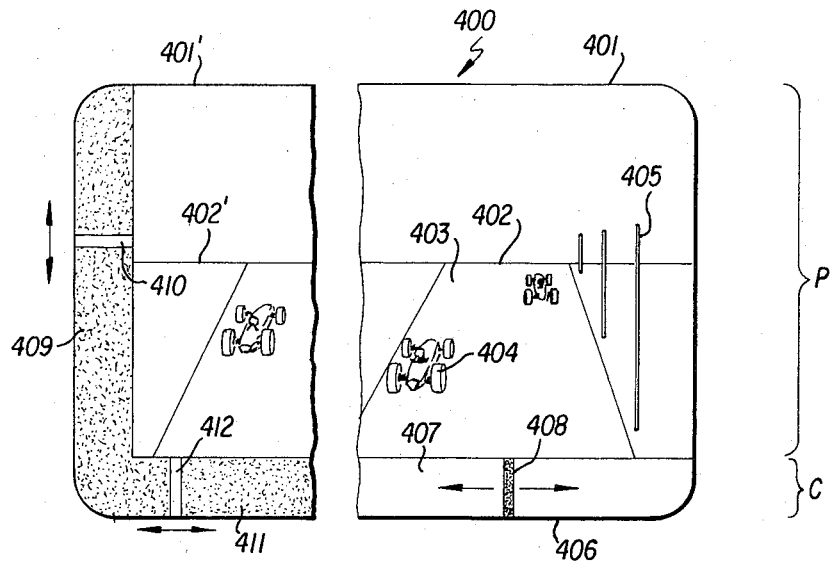
FIG. 16 is a pictorial representation of program and control images.

FIG. 16 shows a representation of a display 400 having a program image 401 and a control image 406.

Program image 402 is representative of a race track 403 with a horizon 402 having cars such as 404 racing toward it. Simulated distance markers 405 aid in giving a three dimensional effect to the viewer. This constitutes the program image designated as P. Extending across the bottom of the screen, shown broken away, is the control image C. It consists of a white background 407 with a black vertical strip 408 moving back and forth, as indicated by the arrows. The black stripe, or it could be a dot in the alternative, is what deactivates the photocell.

An alternative arrangement is shown in FIG. 16 also. In the alternate arrangement, a program image 401' is seen as having a false horizon 402' and is generally identical to image 401. The control image differs, however, in two respects. A black background 411 is employed with a white stripe 412 which moves back and forth as indicated by the arrows. In this case, a different electronic circuit can be employed with activation, rather than the deactivation of the photocell sounding a buzzer. Also, the control image extends upwardly along the left-hand side of the screen as at 409 and a second white strip 410 is seen to move vertically as indicated by the arrows. An interactive device such as an accelerator pedal for moving a second photocell vertically in front of image 409 can be incorporated in the console 12. In either case, when the photocell overlies the strip, it is either activated or deactivated.

If the operator makes an error and steers his target car onto another race car, the photocell 52 will be positioned over a dark area, thus deactivating the photocell 52 causing the transistorized circuit to activate relay 228 and moving biased arm 230 to break the motor counter circuit, thus stopping counter wheel 20 and completing the buzzer circuit sounding buzzer 238.

When the operator moves target 36 to a correct position, photocell 52, 224 is energized, thus breaking the circuit to realy 228 and allowing the bias of arm 230 to again complete the motor circuit, again starting counter wheel 20 and stopping the buzzer from sounding.

The object the operator is attempting to attain during the set period of time is to obtain the highest possible score on the counter. To do this, he must maintain activation of the photocell.

Figure 8:
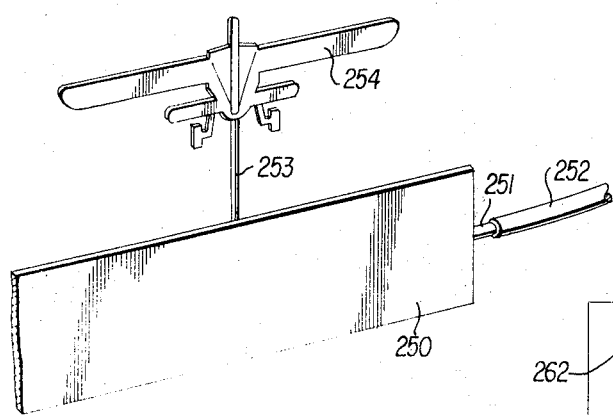
FIG. 8 is a partial perspective view of an alternate target for use with the embodiment of FIG. 1.

The projected program and control images naturally can vary considerably; they can be representative of a flying situation wherein the object is to either avoid other objects in the sky or to trail and "gun down" another plane. Alternatively, the object may be to land a plane perfectly on a runway. A target plane, such as 254 as seen in FIG. 8, may be utilized in conjunction with an attachment 250 having rod 253, sheath 251 and lead 252. Such a system could incorporate a variation of the Driver's Set console with a control stick on the console, as used in older aircraft. The base of the control stick would extend through the console 12 and be universally pivoted in the panel 14. Attached to the base of the stick are two pairs of sheaths and guide wires, one pair moving with any forward and back motion of the stick and the other moving with any side-to-side movement thereof. The latter sheath and guide wire is connected to the television attachment in the same manner as shown in the Driver's Set. The other would take the place of the target rod, such as 50 and have its lead terminating in a target block such as 46, only larger. The sheath and guide wire would then extend upwardly and have the target plane, such as 254, attached to the ends thereof. The photocell would be attached to the sheath below the upper edge of the attachment so that as the block, carrying the second sheath and consequently the photocell, is moved longitudinally, the photocell can simultaneously be moved vertically.

Alternatively, a second attachment can be provided to be fastened over one vertical side edge of the television screen and the vertical movement sheath attached to it. In this variation, both attachments would be identical to the Driver's Set attachment 32 and a second control image would be provided next to the program image as shown in FIG. 16. The entire control image is then L-shaped, as shown with the program image of a square or rectangle bordered on one side and the bottom by the control image. Naturally, this variation necessitates two photocells and requires an additional transistor in the circuitry shown in FIG. 7.

Insofar as the circuitry is concerned, it is obvious that many variations can be used, all of them of conventional design and in some cases, "off the shelf" PC circuits commercially available.

Obviously, other sporting type programs and films can be utilized with various targets. For example, speedboat races, power boating under various conditions, cross-country motorcycling, shooting the rapids, bobsled races, sno-mobile races, waterskiing, tobbogganing and downhill skiing with appropriate targets are just a few of the variations possible.

The two dimensional Pilots Set permits the operator-viewer to fly his plane exercising skill and judgement with "enemy" aircraft, fly aerial obstacle courses, and effect aircraft carrier landings with "at sea" and "crosswind" conditions simulated. The targets can range from piper cubs to jet fighter aircraft. The programmed material can take into account differences in speeds and judgement timing factors necessary to play the game, or develop skills.

Other variations can be submarine docking and sea battles, space flights, docking with other space vehicles, hitting a moving baseball image with buzzer alarm with each hit, or a hockey goalie stopping simulated pucks from various positions.

Referring now to FIGS. 9–15, there is shown a third embodiment of the invention which may also take several forms and vary considerably.

Figure 9:
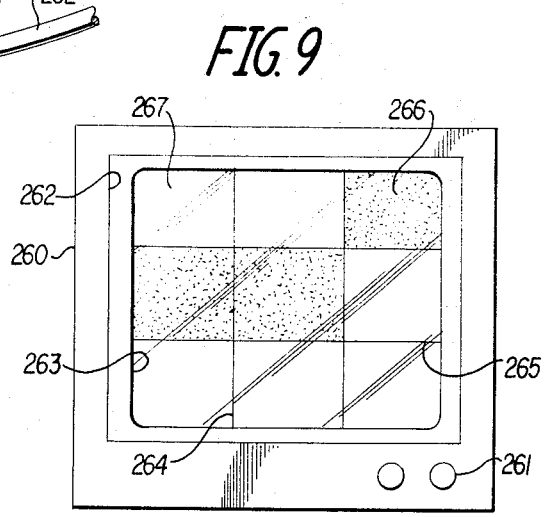
FIG. 9 is a front view of a television screen disclosing a sample matrix pattern for controlling the second embodiment of this invention.

FIG. 9 shows the front of a television set 260 having controls 261 and screen 262 with an image 236 fixed thereon. The image is a grid consisting of vertical lines 264 and horizontal lines 265. The programmed lines divide the image up into individual grid areas which change from light as at grid 267, to dark as at grid 266, to activate photocells placed in front of each grid on an attachment (not shown). The type of attachment used with the control image 263 would have at least nine photocells, arranged in three rows corresponding to the grid areas on the screen. These photocells are hooked into appropriate circuitry to detect the presence or absence of light, the rate at which a grid area may "blink" or pulse at various frequencies or the variation in light intensity.

Since an attachment to accommodate the entire control image area or screen will block out any possible program image, unless one grid area is used as a program image and the attachment has a corresponding cut-out area therein, a smaller attachment is preferred. One example of such an attachment is shown in FIGS. 14 and 15. The attachment 350 is circular in configuration and is adapted to overlie a circular control image on a television screen. The control image contemplated is one broken into four equal quadrants, or more, with or without a small image area in the center. As shown, the attachment 350 has a tapered housing 351 with circular flange 352. Tapered housing 351 also has a reinforced flange portion 353 and a gripping portion 354 which receives power cord 363. Mounted in any conventional manner (not shown) inside housing 351 are four identical photocells 358, 369, 370 and 371, each adapted to overlie a quadrant of the circular control image. The photocells have cell portions, such as 367 and the light-receiving apertures 368. Wires such as 360 connect the photocells to the main power cable 363.

A central portion 355 is located within housing 351 and provides the support for the base portion 362 of a large translucent suction cup 356 having a concave recessed area 357. A fifth photocell 359 is mounted within suction cup 356 and has wires 361 passing through base portion 352 and the cup 356 to attach it to the main power cable 363. The fifth photcell may act as a main on-off control for the rest of the photocells or may be eliminated in its entirety. Naturally, the suction cup is of a material that will transmit light and any number of photocells may be placed within attachment 350.

An attachment such as 364 may be provided on the end of cable 363. The attachment has base plate 365 and a plurality of prongs such as 366. The attachment can be employed with a "Light Box", the third described embodiment of this invention, or can be used to control the operation of a toy, etc.

Figure 10:
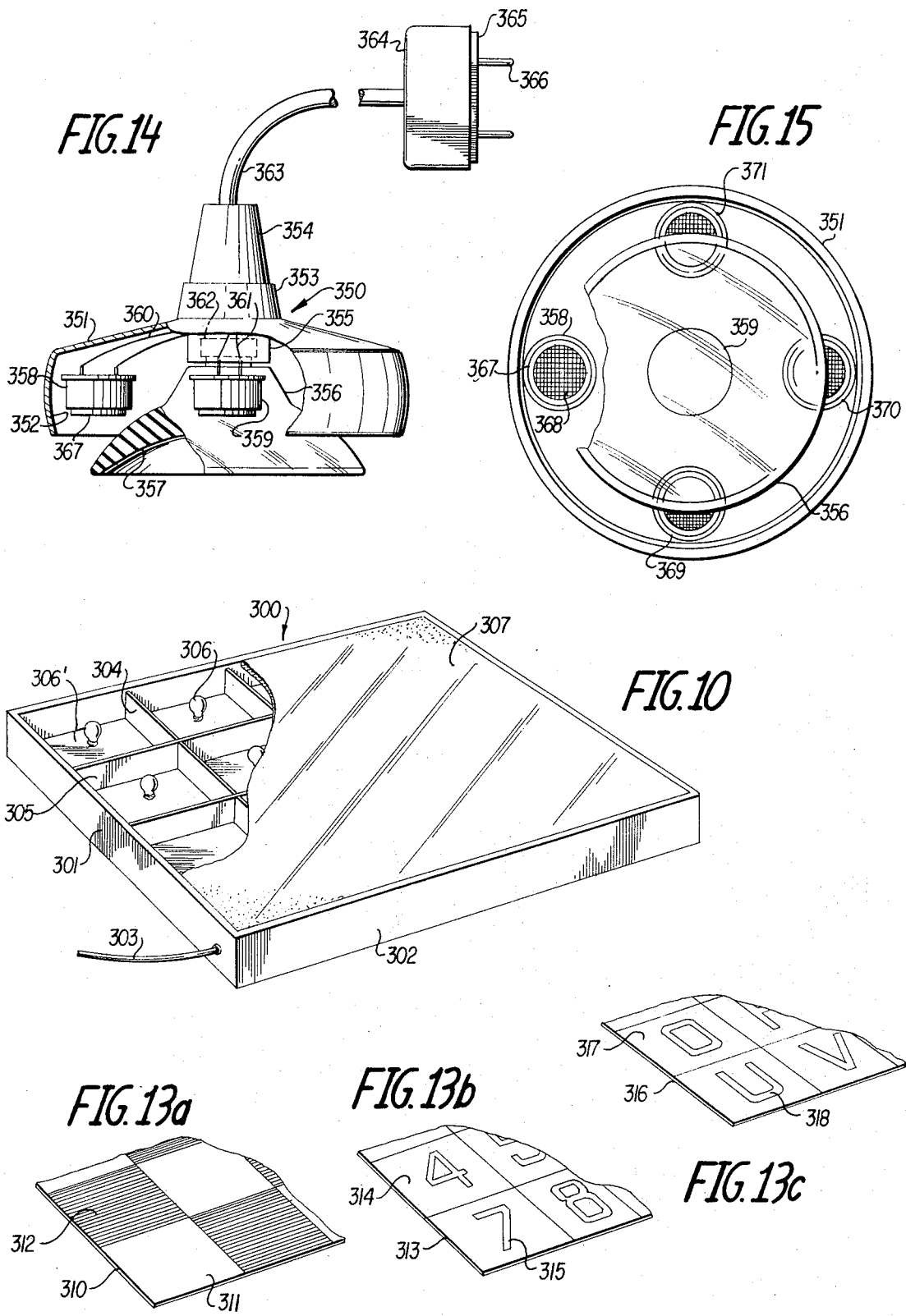
FIG. 10 is a perspective view, partially broken away, of the second embodiment of this invention.
Figure 11:
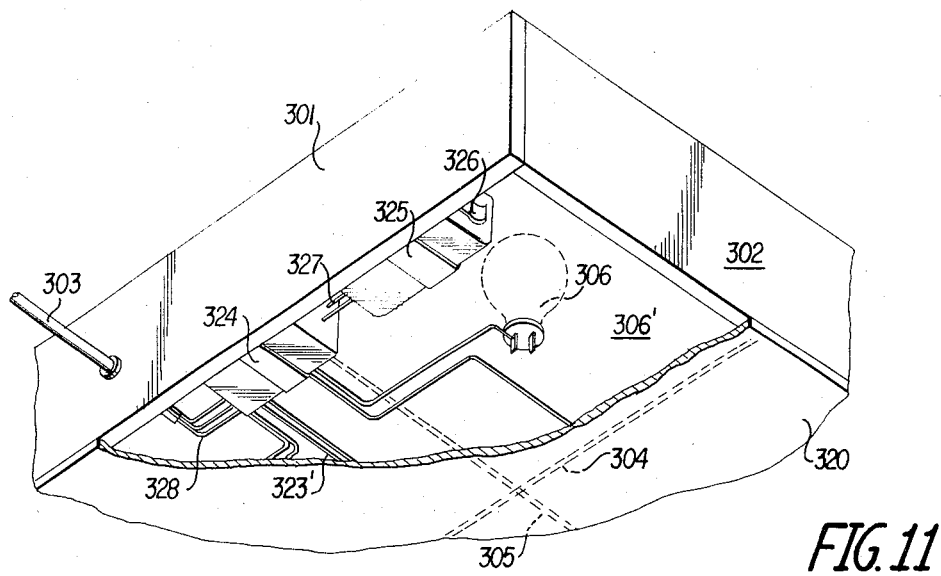
FIG. 11 is a bottom perspective view, partially broken away, of the second embodiment of this invention.

A "Light Box" attachment is shown in FIGS. 10,11 12, 13a–13c and 17 and is designated generally as 300. Referring to FIG. 10, the box 300 is shown as having sides 301,302 and being of generally rectangular configuration. It has a raised base surface 306' and a plurality of dividers 304,305 which divide the box up into square or rectangular areas or grids. Mounted in each of these areas are lamps such as 306. A power cord 303 from the television attachment may be attached to the box by a plug such as 364 (FIG. 14) or directly attached to the box as shown in FIG. 11. A translucent or transparent panel 307 covers the top of the box. Adapted to be placed atop panel 307 are a series of overlays such as shown in FIGS. 13a–13c. Each of the overlays is representative of either a game or an eductional code.

Overlay 310, e.g., has a series of alternating white (311) and black (312) squares which can be representative of a chess or checker board. The number of squares would naturally correspond with the number of grid areas such as 306' and the number of photocells in the attachment 350.

Overlay 313 has a series of square areas such as 314, each of which has indicia in the form of a number such as 315 thereon. A similar overlay 316 has a series of square areas such as 317 having indicia in the form of letters such as 318 thereon.

Various areas may be sequentially lit by activation of the photocells in the television attachment.

Referring now to FIGS 11, the underside of the box 300 is shown. Each lamp 306, shown in dotted lines, has a base socket 321 with leads such as 322 extending therefrom. Wires, such as 323 and 323', connect the base sockets with integrated circuitry in housing 324. Cable 303 passes through side 301 and the individual wires 328 from the photcells in the suction cup attachment are also fed into housing 324. Connected to housing 324 by wires 327 is a power source such as battery 325 held in place by clip 326. Wires 323 and 323', battery 325 and housing 324 are located between raised surface 306' and base plate 320.

Figure 12:
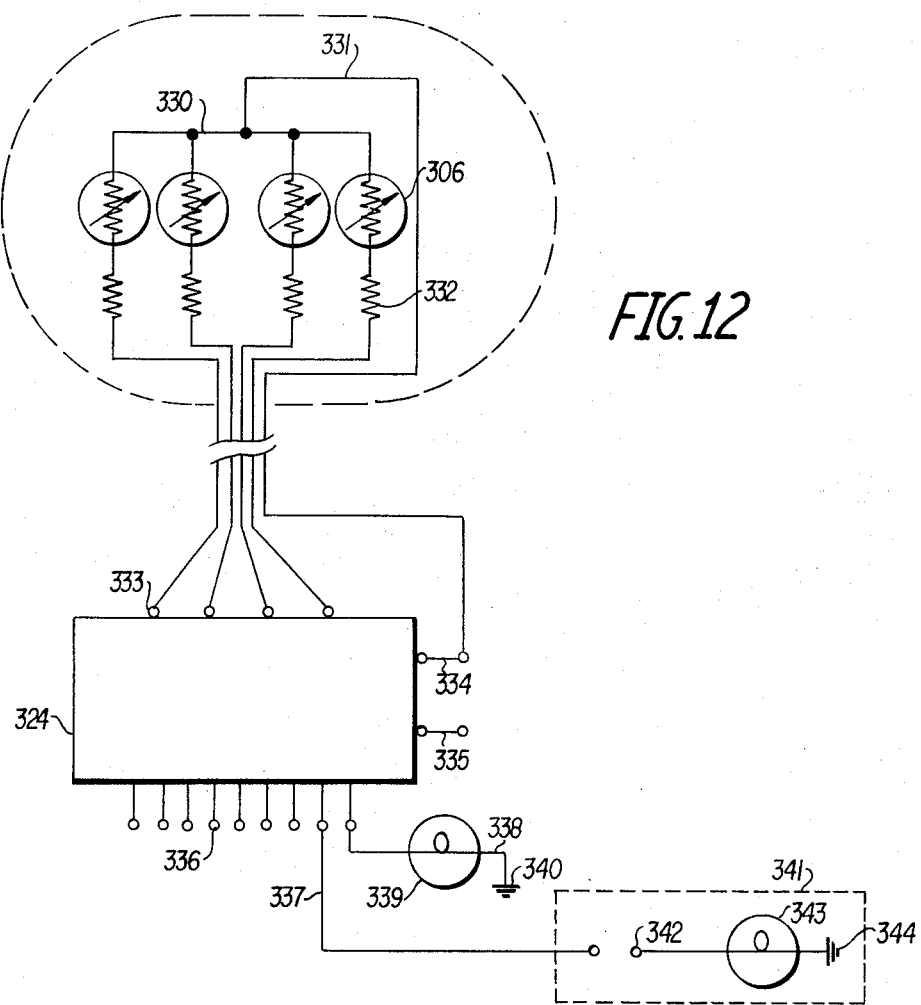
FIG. 12 is a schematic showing the electronic circuitry of the second embodiment of the invention.
Figure 17:
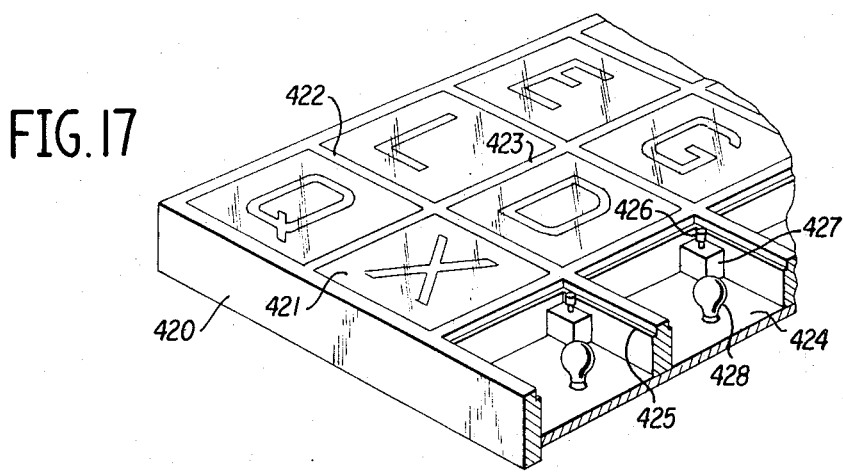
FIG. 17 is a partial perspective, partially broken away, of one form of one embodiment of this invention.

FIG. 12 shows the electrical schematic and circuitry of the light box. A plurality of photocells 306 and resistors 332 are connected between line 331, attached to integrated circuit 324 at 334, and connection 333 on the integrated circuit 324. Integrated circuit 324 has a plurality of connections such as 336 to which are attached a plurality of leads 338 from the light box 300 having lamps 339 and ground 340. Also connected to the integrated circuit are a plurality of operator-viewer circuits 341 having a push-buttom operated switch 342, lamp 343 and ground 344. These latter circuits can be incorporated right into the light box by providing conventional "touch" or contact switches, as shown in FIG. 17, beneath a plurality of square translucent panels which would overlie the grid areas in lieu of panel 307 as seen in FIG. 10. The switch 342 can be a momentary "on" switch, in which case the lamp 343 will only illuminate when the overlying panel is depressed or can be "on-off" requiring a second depressing of the panel to extinguish lamp 343. Preferably they will be of the latter type with a pulse from integrated circuit 324 adapted to re-open switch 342 and extinguish the lamp 343. The "button" panels would be of the same dimensions as the grid areas and be secured in relation to the grids 304,305 in such a manner as they could be depressed against a bias, such as a leaf spring. The exact configuration, naturally, can vary, as well as the type of switch. The integrated circuit 324 is of conventional "off-the-shelf" design.

FIG. 17 shows a light box attachment 420 having a plurality of grids 422,423 surrounding translucent panels such as 421. The panels are adapted to lie flush with the top of the grids and rest on shoulders, such as 425, on each grid member. In each square created by the grids are a switch 427 having a contact 426 adapted to trigger when the overlying panel, preferably made of plastic, is pushed and depressed and a lamp 428, alternately a heat switch, such as those used in elevator controls, may be used where the individual merely touches the panel and the heat of his hand triggers the switch.

Figure 18:
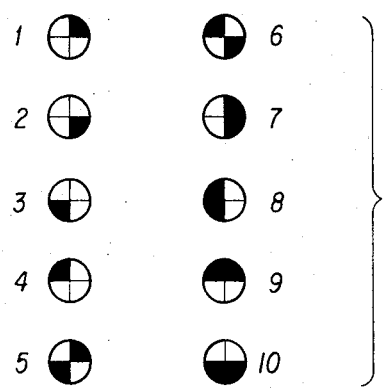
FIG. 18 is a pictorial representation of a binary coding system.

FIG. 18 shows a control image to be used with an attachment of the type shown in FIGS. 14 and 15. The image is in the form of a circle with four quadrants. Naturally, only four photocells would be used. As shown, the four guadrants are used to show a binary code for, e.g., the numbers 1–10. For each number different quadrants or combination of quadrants can be lit or darkened, depending on the photocell circuitry. Other shapes and binary systems obviously can be used, such as pulsing a single dot, the frequency of pulsing representing different numbers or letters.

The devices and programs illustrated above present several ways in which the control information is put in the image. Additionally, there are a number of important extensions and modifications of these which are considered to be within the scope of this disclosure.

In programming material for both the Driver ' Set and the Pilots' Set, the controlling information was encoded in terms of:
1. the presence or absence of a spot(s) of light;
2. the position of that spot(s); and
3. the particular moment at which any spot(s) was present or absent.

All three of these characteristics, in various combinations, are important in conveying the control information. Additionally, 4. the spot(s) may exist in particular colors or may vary in intensity;
5. the spot(s) may "blink" or pulse at various frequencies;
6. the spot(s) may vary in size and/or shape with time; and
7. the spots may be grouped or arranged within the image area in significant ways.

Finally, a great number of variations, combinations and permutations of the above are possible and could be read out by appropriate devices.

It would be hard to overstate the educational potential of the simple light box described were it to be used in conjunction with national television. It provides an "addressable" interactive system designed to utilize the visual communication network already existing in millions of homes. Most importantly, this network can be utilized now, with the television sets currently in use, by the simple act of attaching a suction cup photocell to the TV set.

Further, in the description of the light box it was indicated that the attachment 364 of FIG. 14 might contain the integrated circuit rather than the light box itself, and that this attachment could be used to control the operation of various mechanisms.

In reference to the Drivers' and Pilots' Sets, and other toy devices that have been mentioned herein, the concept of toy is not to be limited and is meant to encompass many other devices having specific purposes and the following example suggests a great number of possibilities.

While only several embodiments of this invention have been shown and/or described, it will be apparent to those of ordinary skill in the art that many changes and modifications can be made without departing from the scope of the appended claims.

What is claimed is:

1. A visual display and response apparatus, said apparatus comprising a surface means, projection means for providing a visual display on said surface means in the form of a program image containing information and a control image, said control image being within the confines of said program image and being small in relation thereto, a photo-optical readout means on said surface and overlying said control image, said control image containing light signals related to the subject matter of said program image, a viewer response means operatively connected to said photo-optical readout means, said response means including a power source, a housing, a circuit means, a switch means and a plurality of translucent panel means arranged in a grid pattern in said housing, said panel means being individually depressable, and lamp means operatively connected to said circuit means and adapted to selectively illuminate individual panel means upon receipt of an appropriate signal from said control image and switch means operatively connected to said circuit means and adapted to be activated by a viewer depressing a selected panel means to light said lamp means to illuminate said depressed panel means.

2. An apparatus as in claim 1 wherein said panel means are arranged in a rectangular grid and said lamp means comprises individual lamps located under each panel means.

3. An apparatus as in claim 1 wherein said translucent panel means comprises a plurality of individual translucent panel members and said switch means comprises a plurality of individual switches, each switch located beneath an individual translucent panel member so as to be activated when said panel member is depressed.

4. An apparatus as in claim 3 wherein said panel members are translucent rectangular plastic members.

5. An aparatus as in claim 3 wherein said lamp means comprises individual lamps located beneath each translucent panel member, said lamps when illuminated adapted to be extinguished by a signal from said control image.

6. An apparatus as in claim 1 wherein said photooptical readout means includes a suction cup for attaching it to said surface means.

7. An apparatus as in claim 1 wherein said photooptical readout means includes a plurality of photocells.

8. An apparatus as in claim 1 and including at least one overlay adapted to fit over said grid, said overlay containing information thereon in the form of a plurality of translucent areas, each translucent area adapted to overlie an individual panel means within said grid.

9. An attachment for allowing a viewer to interact with a visual display presented on a surface and having a program image containing information and a relatively small control image for presenting coded light signals located within the confines of said program image, said attachment comprising a photo-optical readout means adapted to overlie said control image to thereby block it from sight of the viewer and to receive said coded light signals from said control image, a viewer response means, said response means including a housing, circuit means within said housing and connected to said photo-optical readout means, a panel means on said housing including a plurality of translucent panel means arranged in a grid pattern, said panel means being individually depressable, lamp means connected to said circuit means and adapted to illuminate said individual panel means upon receipt of a signal from said control image via said photo-optical readout means and said circuit means, switch means, said switch means operatively connected to said circuit means and adapted to be activated by a viewer depressing a selected panel means and further adapted to light said lamp means to illuminate the depressed panel means.

10. An attachment as in claim 9 wherein said lamp panel means comprises individual lamps located beneath each individual panel means and adapted to remain illuminated by said circuit means until receipt of a signal from said control image to extinguish them.

11. An attachment as in claim 9 wherein said circuit means includes a power source.

12. An attachment as in claim 9 and including at least one overlay adapted to fit over said grid, said overlay containing information thereon in the form of a plurality of translucent areas, each translucent area adapted to overlie an individual panel means within said grid.

13. An attachment as in claim 9 wherein said photo-optical readout means includes a suction cup adapted to secure it to said surface.

14. An attachment as in claim 9 wherein said photooptical readout means further includes a plurality of photocells secured within said suction cup.

15. An attachment as in claim 9 wherein said grid is in the form of a rectangle, said translucent panel means comprises a plurality of rectangular plastic members arranged to form said rectangular grid.

* * * * *